United States Patent [19]

Kreiger et al.

[11] 4,003,736
[45] Jan. 18, 1977

[54] METHOD FOR PREPARING DRY-COLLECTED FUME FOR USE IN METALLURGICAL FURNACES

[75] Inventors: John W. Kreiger; Charles E. Jablonski, both of Bethlehem, Pa.

[73] Assignee: Bethlehem Steel Corporation, Bethlehem, Pa.

[22] Filed: July 1, 1975

[21] Appl. No.: 592,288

[52] U.S. Cl. .................................. 75/3; 75/28
[51] Int. Cl.[2] .................................. C22B 1/08
[58] Field of Search ............ 75/1, 3, 5, 4; 264/117; 23/313 P

[56] References Cited

UNITED STATES PATENTS

| | | | |
|---|---|---|---|
| 1,994,378 | 3/1935 | Williams | 75/3 X |
| 2,173,535 | 9/1939 | Francis | 75/25 |
| 3,169,054 | 2/1965 | Werner | 75/3 OR |
| 3,318,685 | 5/1967 | Handwerk | 75/5 |
| 3,652,260 | 3/1972 | Azami | 75/3 OR |
| 3,770,415 | 11/1973 | Carignani | 75/3 OR |
| 3,770,416 | 11/1973 | Goksel | 75/25 OR |
| 3,851,827 | 12/1974 | Carnignani | 241/65 OR |

FOREIGN PATENTS OR APPLICATIONS

| | | | |
|---|---|---|---|
| 40-15321 | 7/1965 | Japan | 75/5 |

OTHER PUBLICATIONS

Cavaghan, N. J., et al.; *Utilization of In Plant Fines*; Journal of The Iron and Steel Industry June, 1970 pp. 538–542.
Jackson, A.; *Fume Cleaning In Ajax Furnaces*, Special Report 83, Report of the Proceedings of the Autumn General Meeting of the Iron and Steel Institute (1963).

*Primary Examiner*—G. Ozaki
*Assistant Examiner*—Michael L. Lewis
*Attorney, Agent, or Firm*—Joseph J. O'Keefe; Charles A. Wilkinson; John S. Simitz

[57] ABSTRACT

A method for preparing strong, stable "green" balls of dry-collected iron-bearing fume, which contains not less than about 8% combined amount of lime (CaO) and magnesia (MgO). The fume is charged to a balling device where there is added to the fume a quantity of water equal to both the stoichiometric amount required to completely hydrate such lime and magnesia and to produce in the green balls a water content between about 7% – 12%. The residence time of the fume on the balling device is not less than about 8 minutes.

3 Claims, 2 Drawing Figures

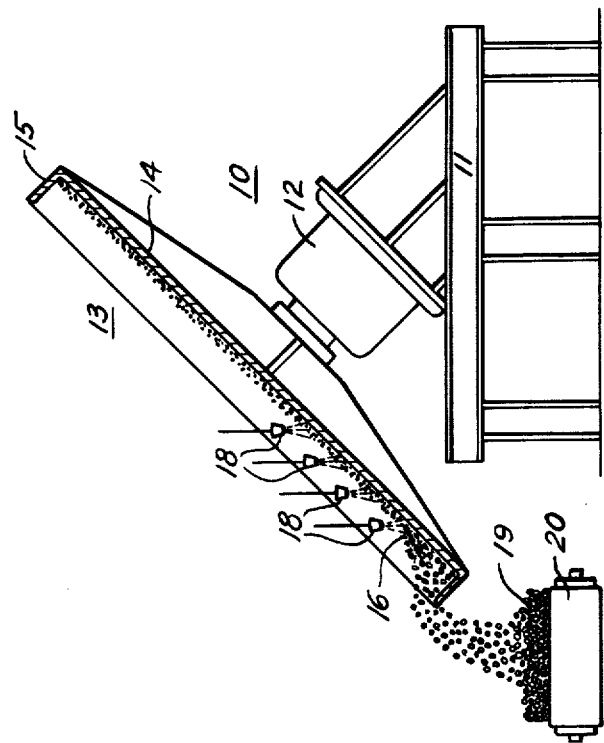
FIG. I
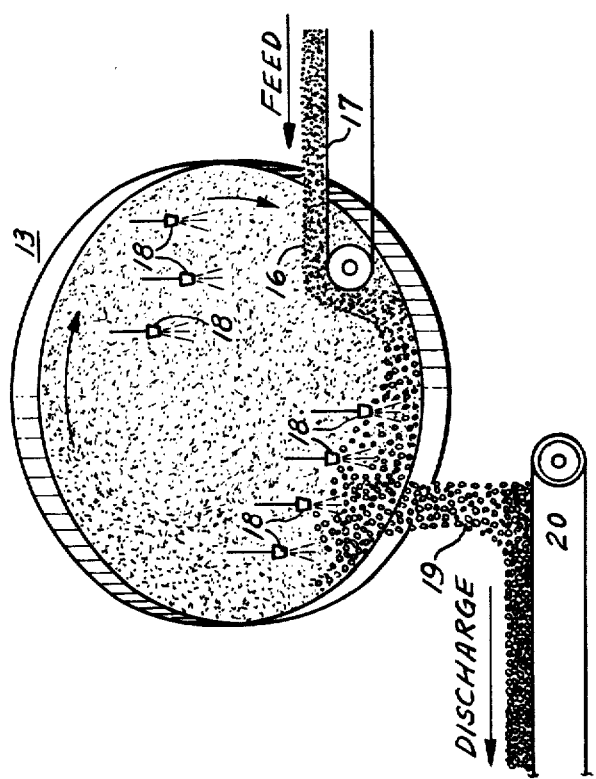
FIG. 2

METHOD FOR PREPARING DRY-COLLECTED FUME FOR USE IN METALLURGICAL FURNACES

BACKGROUND OF THE INVENTION

The present invention broadly relates to a method of green balling iron-bearing fume, which is recovered during oxygen steelmaking operations, to form strong, stable balls suitable for charging into steelmaking furnaces. More particularly, the present invention relates to an economical method of forming dry-collected iron-bearing fume, which contains lime (CaO) and magnesia (MgO) in a combined amount not less than about 8%, into green balls suitable for charging into steelmaking furnaces.

The use of large amounts of oxygen in steelmaking processes has led to the production of great quantities of fume and a need for expensive gas-cleaning equipment to prevent atmospheric pollution. Such fume, sometimes referred to as dust, consists of fine particles of elements and metallic and non-metallic compounds, such as iron oxide, zinc oxide, lead oxide, sulphur compounds, carbon, silicon dioxide, aluminum oxide, calcium oxide, magnesium oxide and the like. The particles range in size from about one tenth of a micron to about 25 microns in diameter and are suspended in the exhaust gases passing from oxygen steelmaking furnaces. To clean such gases and to recover the fume emitted during steelmaking operations various devices, such as wet scrubbers, electrostatic precipitators, bag houses, etc. are used. Depending upon the manner in which the gases are cleaned the collected fume is considered wet-collected or dry-collected. Although fume containing gases can be fairly effectively cleaned by such devices, the disposal of the collected fume has presented a considerable problem. Attempts have been made to recharge the fume into steelmaking furnaces and to sinter it for charging into blast furnaces but, by and large, such fume is currently being dumped. However, because of the value of certain materials, such as iron and alloys, in fume, steelmakers have continued efforts to make use of such fume and in particular to recharge it into steelmaking furnaces.

There are a variety of ways in which particulate materials, such as iron ore concentrates, fume and the like may be caused to cohere or form into generally sperical agglomerates. They may be nodulized, briquetted, sintered, pelletized or balled. The balling process is particularly desirable for the agglomeration of finely divided particles, such as fume, because they are normally of such size that they will form into balls of relatively uniform size with little difficulty. The size of the balls formed on a balling device is directly related to the speed of rotation of the balling device, its inclination, the amount of particulate material held on the balling device during the balling operation, the feed rate of particulate material to the device, and the residence time of the particulate material on such device. The physical strength of the balls discharged from the balling device is dependent upon the size distribution of the particles of the material, the packing characteristics of the particulate material, the cohesive forces which are present when the particulate material is moist, the amount of moisture present in the balls and their porosity.

The balls, which are formed on a rotating balling device, such as a disc, cone, or drum, may be used as green balls or may be heat treated at elevated temperatures to produce heat-hardened pellets. Heat-hardened pellets have substantially greater strength than green balls and can be successfully charged into steelmaking furnaces. However, because of the cost of the heating step steelmakers would prefer not to have to resort to the heat-hardening treatment for such balls. Strong and stable green balls made from wet-collected fume and mixtures of wet-collected and water-leached dry-collected fume have also been successfully charged into steelmaking furnaces. However, heretofore, steelmakers have not been able to form dry-collected fume into green balls which could be successfully charged into steelmaking furnaces. Invariably, after dry-collected fume has been formed into green balls they have disintegrated after being placed in storage for only a short period of time.

The term green balls as used herein refers to balled material which has not been hardened by heating, i.e., after balling there is no heating to produce a sintered or heat-bonded ball. Obviously for a green ball to be used satisfactorily in steelmaking operations it must have sufficient strength to support a load and to resist degradation during transport and handling. Hereinafter strong and stable will be used to describe green balls which have met a "strength test", which is one test that has been utilized in the balling and pelletizing industry to determine whether or not a ball or pellet will survive handling in service. To satisfactorily meet the requirements of the strength test a green ball must have a compression strength of at least 15 pounds per square inch and be able to survive at least 10 drops from a height of 18 in. onto a steel plate. It has been found that strong and stable green balls, i.e., balls which have passed the strength test, will successfully resist degradation during transport and handling and will be suitable for charging into steelmaking furnaces.

DESCRIPTION OF THE DRAWINGS

FIGS. 1 and 2 are schematic elevation and end views respectively, of a balling device which is suitable to practice the method of the present invention.

DESCRIPTION OF THE INVENTION

By the method of this invention it is possible to prepare strong and stable green balls from dry-collected oxygen steelmaking fume which contains iron in an amount of about 50% or more by weight and not less than about 8% by weight of lime (CaO) plus magnesia (MgO). Referring to the drawings there is shown a typical balling machine 10 supported on base 11 and having drive 12 and disc 13, which has bottom 14 and side 15 and rotates in a clockwise manner, as shown by the arrow. Iron-bearing oxygen steelmaking fume particles 16 are fed on conveyor 17 and discharged from its end onto a lower portion of disc 13. Some of the fume particles fall directly into the trough formed by bottom 14 and side 15, while the remainder of the particles fall onto and adhere to small balls formed of particles which have previously fallen on such disc. As disc 13 rotates, it carries with it the fume particles and the small balls with their adherent fume particles which are sprayed with water from nozzles 18 that are positioned at various locations above disc 13. By continuously spraying water onto the fume and the balls, layers of fume are successively deposited one on top of another until the fume particles aggomerate and form balls. In addition the water causes the lime (CaO) and magnesia (MgO) to hydrate. The residence time of the fume on the disc is dependent upon several factors, as is well known to those skilled in the art, including the disc angle, its rotational speed, the rate of feed of fume to the disc, the size of the balls desired, etc.

Any suitable prior art method for balling may be used provided there is added to the fume the stoichiometric amount of water necessary to hydrate the lime (CaO) and magnesia (MgO) and an additional amount of water sufficient to provide between about 7% and 12% water in the green balls. In addition, the fume must be retained on the balling disc for a minimum period of not less than about 8 minutes. By following balling practices well known to those skilled in the art and by using the proper amount of water and the proper retention time on the disc as mentioned above, there will be formed strong, stable green balls 19 which will be discharged from disc 13 onto conveyor 20.

The importance of the proper amount of water and the proper residence time of the fume on the disc with respect to this invention cannot be overemphasized. If there is added to the fume less than the stoichiometric amount of moisture necessary to hydrate the lime and magnesia, the green balls so formed will not be strong and stable and they will disintegrate if subjected to any amount of handling. If, in addition to the stoichiometric amount of water added to the fume the amount of water is such that the green balls have a moisture content of either less than 7% or greater than 12% problems with respect to balling will arise. A moisture content of less than 7% will produce a very dry unsatisfactory ball, while a moisture content of greater than 12% will result in a "soupy" mixture of particles which is unsuitable for balling or agglomerating purposes.

If the residence time of the fume on the balling device is less than about 8 minutes, the reaction between water and the lime and magnesia will not be completed on the balling device. The reaction between the water and lime and magnesia will then continue after the balls have been discharged from the balling device. Moisture needed for binding is used for hydration and, hence, is not available for binding purposes. In addition, the green balls will become heated to a temperature sufficiently high, because the hydration reaction is exothermic, to vaporize at least a portion of the water. Consequently, sufficient moisture is unavailable for binding purposes, with the ultimate result that the green balls produced are not strong and stable. The retention time of the fume on the disc must be sufficiently long, i.e., at least 8 minutes for the water to both hydrate the lime and magnesia of the fume and to act as a binder for the fume, or else the heat of reaction of the water with the lime and magnesia will very adversely affect the strength of the balls discharged from the balling disc.

Proper residence time for the fume on the disc can be reasonably determined by making sure that there is little or no heat in the balls when discharged from the disc.

If there is a detectable rise in temperature after the balls are discharged from the disc or the balls retain heat after being discharged from the disc the retention time has not been sufficient.

Specific examples of the method of this invention utilized a basic oxygen furnace fume of the following analysis:

| Component | % |
| --- | --- |
| *Fe[7] | 54.0 |
| Silica | 2.17 |
| Alumina | .12 |
| Zinc[**] | 3.16 |
| Lime | 6.09[1] |
| Magnesia | 2.73[1] |
| Sulfur[**] | .07 |
| Manganese | .90 |
| Carbon | 1.52 |
| Lead[**] | .24 |

*Total iron present in the fume as iron oxides.
**Zinc oxides, lead oxides, sulfur dioxide or sulfide reported as the elements zinc, lead and sulfur, respectively.
[1]The sum of lime (CaO) plus magnesia (MgO) is more than 8.00%.

The fume had the following size consists:

| Microns | Mesh Size | % |
| --- | --- | --- |
| 149–74 | −100, +200 | 0.3 to 4.0 |
| 74–37 | −200, +400 | 2.0 to 10.0 |
| 37–25 | −400, +500 | 4.0 to 10.0 |
| under 25 | −500 | 75 to 95 |

2.5 tons per hour of such fume containing 8.82% combined amount of lime and magnesia, i.e., greater than 8%, were fed to a 6 foot diameter balling disc at a rate of 80 pounds per minute. The amount of fume on the disc, calculated on a dry weight basis, was 820 pounds. The disc was tilted at an angle 46° with the horizontal and was rotated at a speed of 10 revolutions per minute. To each 1000 pounds of such fume there was added a total of 31.77 pounds of water to hydrate the lime and magnesia, i.e., 19.58 pounds of water to hydrate the lime and 12.19 pounds of water to hydrate the magnesia. To the 1031.77 pounds of fume and water there was added an additional 77.66 pounds of water for balling purposes, which resulted in the production of balls having about 7% moisture content. Using the same fume to produce green balls having a moisture content of 12% there was added to the 1031.77 pounds of fume and water an additional 140 pounds of water. With respect to the above samples the calculated residence time of the fume on the balling disc for both the 7% water content ball and 12% water content ball was approximately 10 minutes. The green balls produced had a diameter between ⅝ of an inch to ¾ of an inch. All of the green balls so produced were strong and stable, i.e., they were still in one piece after being dropped 10 times onto a steel plate from a height of 18 inches and they had a compression strength of about 18 pounds per square inch. After being stored for four days and visually examined the green balls showed no signs that degradation had occurred during the storage period.

In these specifications and claims, whenever percentages are mentioned, such percentages are on a weight basis, unless otherwise noted. The size of the green balls produced by the method of this invention is dependent upon the type steelmaking furnace into which such balls are charged, i.e., basic oxygen furnace or open hearth furnace and is within the control of persons skilled in the balling field.

We claim:

1. A method for preparing strong, stable green balls, suitable for charging into metallurgical furnaces, from dry-collected iron-bearing fume containing not less than a total of about 8% combined amount of lime (CaO) and magnesia (MgO), formed in basic oxygen steelmaking furnaces, said method comprising:
  a. charging said fume onto a balling device,
  b. agglomerating said fume into green balls on said balling device while adding an amount of water continuously to said fume and retaining said fume on said balling device for a time sufficient for said water to:
    i. combine stoichiometrically with substantially all of said lime and magnesia in said fume, and
    ii. leave an amount of moisture between about 7 and 12% to act as a binder in said green balls discharged from said balling device.

2. The method of claim 1 wherein the residence time of said dry-collected fume in said balling device is not less than about 8 minutes.

3. The method of claim 1 wherein said green balls discharged from said balling device have a compression strength of at least 15 pounds per square inch and survive at least 10 drops from a height of 18 inches onto a steel plate.

* * * * *